(12) United States Patent
Prados (10) Patent No.: US 8,269,726 B2
(45) Date of Patent: Sep. 18, 2012

(54) INPUT DEVICE

(75) Inventor: Michael Prados, San Francisco, CA (US)

(73) Assignee: Volkswagen AG, Wolfsburg (DE)

( * ) Notice: Subject to any disclaimer, the term of this patent is extended or adjusted under 35 U.S.C. 154(b) by 836 days.

(21) Appl. No.: 11/565,141

(22) Filed: Nov. 30, 2006

(65) Prior Publication Data

US 2007/0146343 A1   Jun. 28, 2007

Related U.S. Application Data

(60) Provisional application No. 60/741,254, filed on Dec. 1, 2005.

(51) Int. Cl.
*G06F 3/041*   (2006.01)

(52) U.S. Cl. .................. 345/173; 345/163; 715/701

(58) Field of Classification Search .......... 345/156, 345/158, 204, 173–182; 340/436; 701/1; 178/18.01

See application file for complete search history.

(56) References Cited

U.S. PATENT DOCUMENTS

| | | | |
|---|---|---|---|
| 4,885,565 A | 12/1989 | Embach | 340/407 |
| 5,988,902 A | 11/1999 | Holehan | 400/479.1 |
| 6,118,435 A * | 9/2000 | Fujita et al. | 345/173 |
| 6,249,606 B1 * | 6/2001 | Kiraly et al. | 345/173 |
| 6,407,271 B1 | 6/2002 | Deffense | 554/200 |
| 6,577,928 B2 * | 6/2003 | Obradovich | 701/1 |
| 7,126,583 B1 * | 10/2006 | Breed | 345/158 |
| 7,283,123 B2 * | 10/2007 | Braun et al. | 345/163 |
| 7,653,883 B2 * | 1/2010 | Hotelling et al. | 715/863 |
| 2001/0035854 A1 | 11/2001 | Rosenberg et al. | 345/156 |
| 2005/0219206 A1 | 10/2005 | Schena et al. | 345/156 |
| 2008/0024457 A1 * | 1/2008 | Fliegner et al. | 345/173 |

FOREIGN PATENT DOCUMENTS

| | | |
|---|---|---|
| DE | 20022244 | 6/2000 |
| DE | 20102197 | 2/2001 |
| EP | 1560102 | 8/2005 |
| WO | 98/08241 | 2/1998 |
| WO | 9902630 | 1/1999 |
| WO | 01/24109 | 7/2001 |
| WO | 03/041046 | 5/2003 |

* cited by examiner

*Primary Examiner* — Kevin M Nguyen
*Assistant Examiner* — Kenneth B Lee, Jr.
(74) *Attorney, Agent, or Firm* — King & Spalding L.L.P.

(57) ABSTRACT

An input device, especially for a motor vehicle, has a display, a touch screen arranged above the display and an operating surface, an actuator for moving the touch screen in at least one direction, and a control unit for visually representing changeable operating information and operating elements on the display for detecting a position of a touching of the operating surface and for the haptic feedback by controlling the actuator, wherein a file or a data set is stored in the control unit or in a memory assigned to the control unit, the file or data set comprising graphical information for representing at least operating information or at least one operating element and also control information for a haptic feedback assigned to the operating information or to the operating element.

8 Claims, 9 Drawing Sheets

INPUT DEVICE

CROSS-REFERENCE TO RELATED APPLICATIONS

This application claims the benefit of U.S. Provisional Application No. 60/741,254 filed on Dec. 1, 2005 entitled "EINGABEVORRICHTUNG", which is incorporated herein in its entirety.

TECHNICAL FIELD

The invention relates to an input device, especially for a motor vehicle, said input device comprising a touch screen.

BACKGROUND

A touch screen is known e.g., from DE 201 02 197 U1. DE 201 02 197 U1 discloses a touch screen for visually representing electronic signals and for inputting signs and symbols by touching the screen for confirmation purposes. It includes a functional plane for visual representation and keystroke input and a higher-level protective plane corresponding thereto that is deformable at certain points. In this context, when certain points of the functional plane are selected by touching-type contact across the protective plane, at least one confirmation signal is generated for the user's sense of touch (haptic stimulus) that is perceptible at the position of the point of contact in the deformed protective plane, and the confirmation signal for the sense of touch (haptic stimulus) is generated by vibration elements eccentrically positioned within and/or underneath the functional plane. In addition, in the touch screen known from DE 201 02 197 U1, the generated vibrations are transmitted from the functional plane to the protective plane as the result of direct contacting of the two planes and/or via the edge regions of the planes by way of rigid or elastic connection elements.

In addition, touch screens are known, e.g., from U.S. Pat. No. 4,885,565 and EP 920 704 B1. Suitable touch screens can be obtained e.g., from 3M™ (see www.3m.com). Further details concerning touch screens may be gathered e.g., from EP 1 560 102 A1.

Furthermore, a touch control with haptic feedback for inputting signals into a computer and for outputting forces to a user of the touch control unit for haptic feedback is known from DE 201 80 024 U1 or the corresponding WO 01/54109 A1, in which the touch control comprises a touch input device having an approximately flat contact surface, which is operated in such a way that it inputs a positional signal into a processor of the computer, based on a position on the touch surface that the user touches, during which the positional signal indicates the position in two dimensions. The touch control according to WO 01/54109 A1 further comprises at least one actuator connected to the touch input device, in which the actuator outputs a force on the touch input device in order to provide a haptic sensation for the user touching the touch surface, wherein the actuator outputs the force based on force information released by the processor directly on the touch input device.

Haptic feedback is further disclosed in U.S. Pat. No. 6,429,846, in WO 03/038800 A1, in U.S. Pat. No. 5,988,902, in WO 99/26230 A1 (incorporated by reference), in WO 97/21160 A1, in DE 200 22 244 U1 and in WO 03/41046 A1. WO 99/26230 A1 and corresponding EP 1 036 390 B1 disclose a method for interfacing a multi-tasking graphical environment implemented on a host computer with a force feedback interface device coupled to said host computer, wherein a plurality of application programs are running in said multi-tasking environment, the method comprising: creating a context associated with each application program running in said multi-tasking graphical environment, said contexts being allocated in the memory of said host computer; receiving force effect commands from said application programs, said force effect commands commanding said force feedback interface device to output a force effect specified by said command; storing said force effect commands into said contexts, wherein each of said contexts is associated with one of said application programs running on said host computer, and wherein each of said force effect commands is stored in a context associated with said application program that sent said force effect command; and sending said force effect commands in said context of an application program to said force feedback device when said application program is active in said multi-tasking environment.

U.S. Pat. No. 6,118,435 discloses a touch panel.

SUMMARY

It is the object of the invention to specify an improved input device and to lower the costs for producing an input device.

The aforementioned object is attained by an input device, especially for a motor vehicle, said input device comprising
- a display
- a touch screen arranged above the display and having an operating surface,
- an actuator for moving the touch screen in at least one direction, and
- a control unit for visually representing changeable operating information and operating elements on the display, for detecting a position of a touching of the operating surface and for haptic feedback by controlling the actuator, wherein a file or a data set is stored in the control unit or in a memory assigned to the control unit, said file or data set comprising graphical information for representing at least operating information or at least one operating element and also control information for a haptic feedback assigned to the operating information or to the operating element.

Haptic feedback within the meaning of the invention is especially a movement, which the user can sense and which points to a successful operation or produces a (make-believe) spatial structure.

An operating element, which can be represented by means of the display, can be e.g., a push-button sensor, a switch, a slider, a turning knob, a press button or the like within the meaning of the invention.

The aforementioned input device is especially suited for operating motor vehicles. However, the aforementioned input device can also be a part of a PC, a notebook, a PDA, a messenger, a cellular phone and/or a mobile device for the playback of music or films.

In an embodiment of the invention, the file is an image file. An image file can be e.g., a file in the JPEG, GIF, or BITMAP format. In an alternative embodiment of the invention, the file or the data set comprises commands in a markup language. A suitable markup language can be e.g., XML, HTML, or 3softGuide.

The aforementioned object is further attained by a data carrier with a file stored thereon or with a data set stored thereon, said file or said data set comprising
- graphical information for representing at least operating information or at least one operating element on a display and
- control information for a haptic feedback assigned to the operating information or to the operating element by moving a touch screen arranged above the display and/or moving an input element interacting with the display.

An aforementioned input element interacting with the display can be e.g., a touch panel, a haptic mouse, as disclosed in EP 1 036 390 B1, or a haptic joystick.

Haptic feedback within the meaning of the invention is especially a movement, which the user can sense and which points to a successful operation or produces a (make-believe) spatial structure.

An operating element, which can be represented by means of the display, can be e.g., a pushbutton sensor, a switch, a slider, a turning knob, a press button or the like.

In an embodiment of the invention, the file is an image file. An image file can be e.g., a file in the JPEG, GIF, or BITMAP format. In an alternative embodiment of the invention, the file or the data set comprises commands in a markup language. A suitable markup language can be e.g., XML, HTML, or 3softGuide.

The aforementioned object is further attained by an input device, especially for a motor vehicle, said input device comprising
 a display
 an input device interacting with the display,
 an actuator for moving the input device interacting with the display in at least one direction, and
 a control unit for visually representing changeable operating information and operating elements on the display, for detecting a movement of the input element interacting with the display and for the haptic feedback by controlling the actuator,
wherein a file or a data set is stored in the control unit or in a memory assigned to the control unit, and wherein said file or dataset comprises graphical information for representing at least operating information or at least one operating element and also control information for a haptic feedback assigned to the operating information or to the operating element.

An aforementioned input element interacting with the display can be e.g., a touch panel, a haptic mouse, as disclosed in EP 1 036 390 B1, or a haptic joystick.

Haptic feedback within the meaning of the invention is especially a movement, which the user can sense and which points to a successful operation or produces a (make-believe) spatial structure.

An operating element, which can be represented by means of the display, can be e.g., a push-button sensor, a switch, a slider, a turning knob, a press button or the like within the meaning of the invention.

In a suitable manner, the aforementioned input device can be a part of a PC, a notebook, a PDA, a messenger, a cellular phone, and/or a mobile device for the playback of music or films.

In an embodiment of the invention, the file is an image file. An image file can be e.g., a file in the JPEG, GIF, or BITMAP format. In an alternative embodiment of the invention, the file or the data set comprises commands in a markup language. A suitable markup language can be e.g., XML, HTML, or 3softGuide.

The aforementioned object is further attained by a method for producing an input device comprising a display and an input element interacting with the display, wherein graphical information for representing at least operating information or at least one operating element on a display and control information for a haptic feedback assigned to the operating information or to the operating element by moving the input element interacting with the display is stored in a file or a data set.

Such an input element interacting with the display can be e.g., a touch screen arranged above the display, a touch panel, a haptic mouse, as disclosed in EP 1 036 390 B1, or a haptic joystick.

Haptic feedback within the meaning of the invention is especially a movement, which the user can sense and which points to a successful operation or produces a (make-believe) spatial structure.

In another embodiment of the invention, additional graphical information for representing at least additional operating information or at least one additional operating element on a display and additional control information for a haptic feedback assigned to the additional operating information or to the additional operating element by moving the input element interacting with the display is stored in an additional file or an additional data set.

In another embodiment of the invention, the file and the data set or the additional file and the additional data set is selected for implementing an operating mask, which can be represented on the display.

In another embodiment of the invention, the graphical information is automatically evaluated by means of a pattern recognition. An evaluation in this sense is especially supposed to be the identification of geometric structures and especially their assignment to certain classes of geometric structures. Thus, an aforementioned evaluation of graphical information can detect e.g., a rectangle, which is supposed to serve as an operating element, or detect streets in a map (as graphical information).

In another embodiment of the invention, control information is automatically assigned to the graphical information as a function of the evaluation of the graphical information. Thus, e.g., a certain haptic feedback can be assigned, for example, to an operating element detected as a rectangle. Provision can also be made for assigning a certain haptic feedback to streets so that a user can feel the latter as elevations.

In another embodiment of the invention, the file is an image file. An image file can be e.g., a file in the JPEG, GIF, or BITMAP format. In an alternative embodiment of the invention, the file or the data set comprises commands in a markup language. A suitable markup language can be e.g., XML, HTML, or 3softGuide.

The aforementioned object can be further attained by a method for producing an input device comprising a display and an input element interacting with the display, wherein graphical information for representing at least operating information or at least one operating element on the display is evaluated automatically by means of a pattern recognition. An evaluation in this sense is especially supposed to be the identification of geometric structures and especially their assignment to certain classes of geometric structures. Thus, an aforementioned evaluation of graphical information can detect e.g., a rectangle, which is supposed to serve as an operating element, or detect streets in a map (as graphical information).

Such an input element interacting with the display can be e.g., a touch screen arranged above the display, a touch panel, a haptic mouse, as disclosed in EP 1 036 390 B1, or a haptic joystick.

Haptic feedback within the meaning of the invention is especially a movement, which the user can sense and which points to a successful operation or produces a (make-believe) spatial structure.

In an embodiment of the invention,
the control information for a haptic feedback assigned to the operating information or the operating element by moving the input element interacting with the display is assigned automatically to
the graphical information as a function of the evaluation of the graphical information.

Thus e.g., a certain haptic feedback can be assigned, for example, to an operating element detected as a rectangle. Provision can also be made for assigning a certain haptic feedback to streets so that a user can feel the latter as elevations.

In another embodiment of the invention, the file is an image file. An image file can be e.g., a file in the JPEG, GIF, or BITMAP format. In an alternative embodiment of the invention, the file or the data set comprises commands in a markup language. A suitable markup language can be e.g., XML, HTML, or 3softGuide.

The aforementioned object is further attained by a method for producing an input device comprising a display and an input element interacting with the display, wherein control information for a haptic feedback assigned to operating information or to an operating element by moving the input element interacting with the display is created in the syntax of a markup language. A suitable markup language can be e.g., XML, HTML, or 3softGuide.

Such an input element interacting with the display can be e.g., a touch screen arranged above the display, a touch panel, a haptic mouse, as disclosed in EP 1 036 390 B1, or a haptic joystick.

Haptic feedback within the meaning of the invention is especially a movement, which the user can sense and which points to a successful operation or produces a (make-believe) spatial structure.

In an embodiment of the invention, graphical information for representing the operating information or the operating element on a display is created in the syntax of the markup language.

In another embodiment of the invention, the graphical information and the control information are combined in a data set in the syntax of the markup language.

The aforementioned object is further attained by a method for producing an input device comprising a display and an input element interacting with the display, wherein an operating mask, which can be represented on the display, is implemented by selecting a file or a data set from a plurality of files or data sets, each file or each data set of this plurality of files or data sets comprising
graphical information for representing at least operating information or at least one operating element on a display
and
control information for a haptic feedback assigned to the operating information or to the operating element by moving a touch screen arranged above the display or an input element interacting with the display.

Such an input element interacting with the display can be e.g., a touch screen arranged above the display, a touch panel, a haptic mouse, as disclosed in EP 1 036 390 B1, or a haptic joystick.

Haptic feedback within the meaning of the invention is especially a movement, which the user can sense and which points to a successful operation or produces a (make-believe) spatial structure.

A data set within the meaning of the aforementioned inventions is especially a related set of commands. A data set within the meaning of the aforementioned inventions is especially a related set of program code.

A motor vehicle within the meaning of the aforementioned inventions is especially a land vehicle, which can be used individually in road traffic. Motor vehicles within the meaning of the invention are especially not limited to land vehicles having an internal combustion engine.

Additional advantages and details will become apparent from the following description of example embodiments.

DETAILED DESCRIPTION

Figure 1:
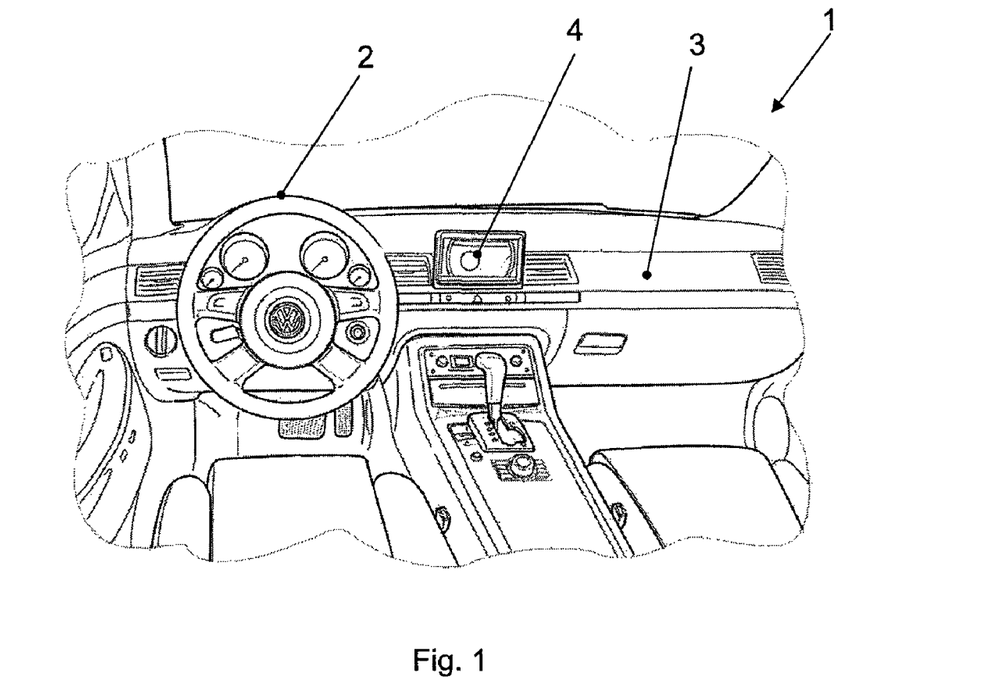
FIG. 1 illustrates an example embodiment for a motor vehicle.

FIG. 1 illustrates an internal view of an example embodiment of a motor vehicle 1. A steering wheel 2 is arranged below a dashboard 3 in the motor vehicle 1. The dashboard 3 comprises an input device 4 arranged adjacent to the steering wheel 2. Alternatively or additionally, an input device corresponding to the input device 4 can also be arranged in the steering wheel 2.

Figure 2:
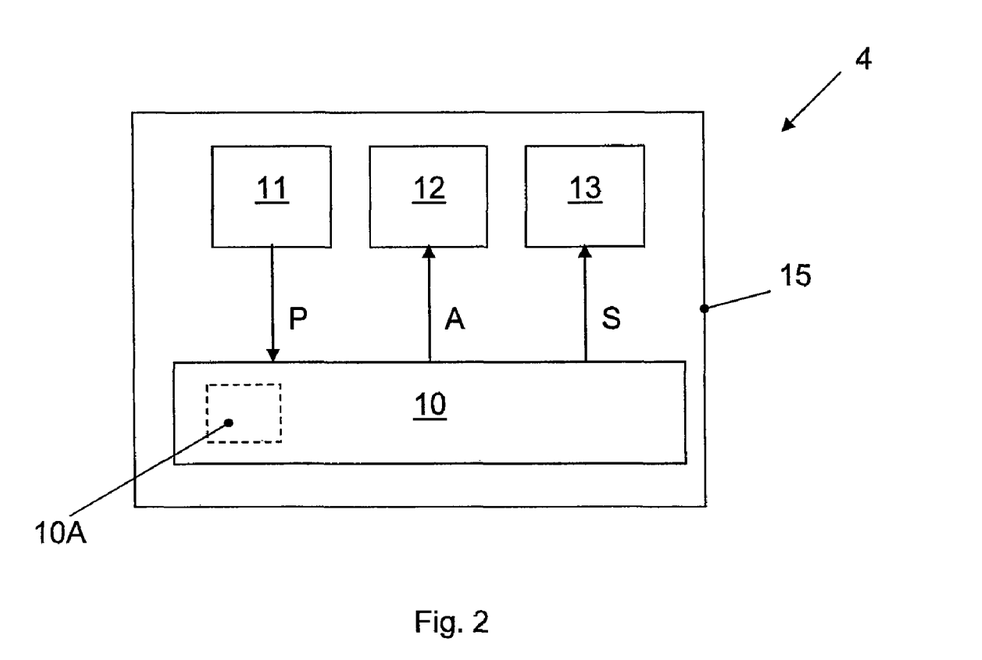
FIG. 2 is the schematic diagram of an example embodiment of an input device.
Figure 3:
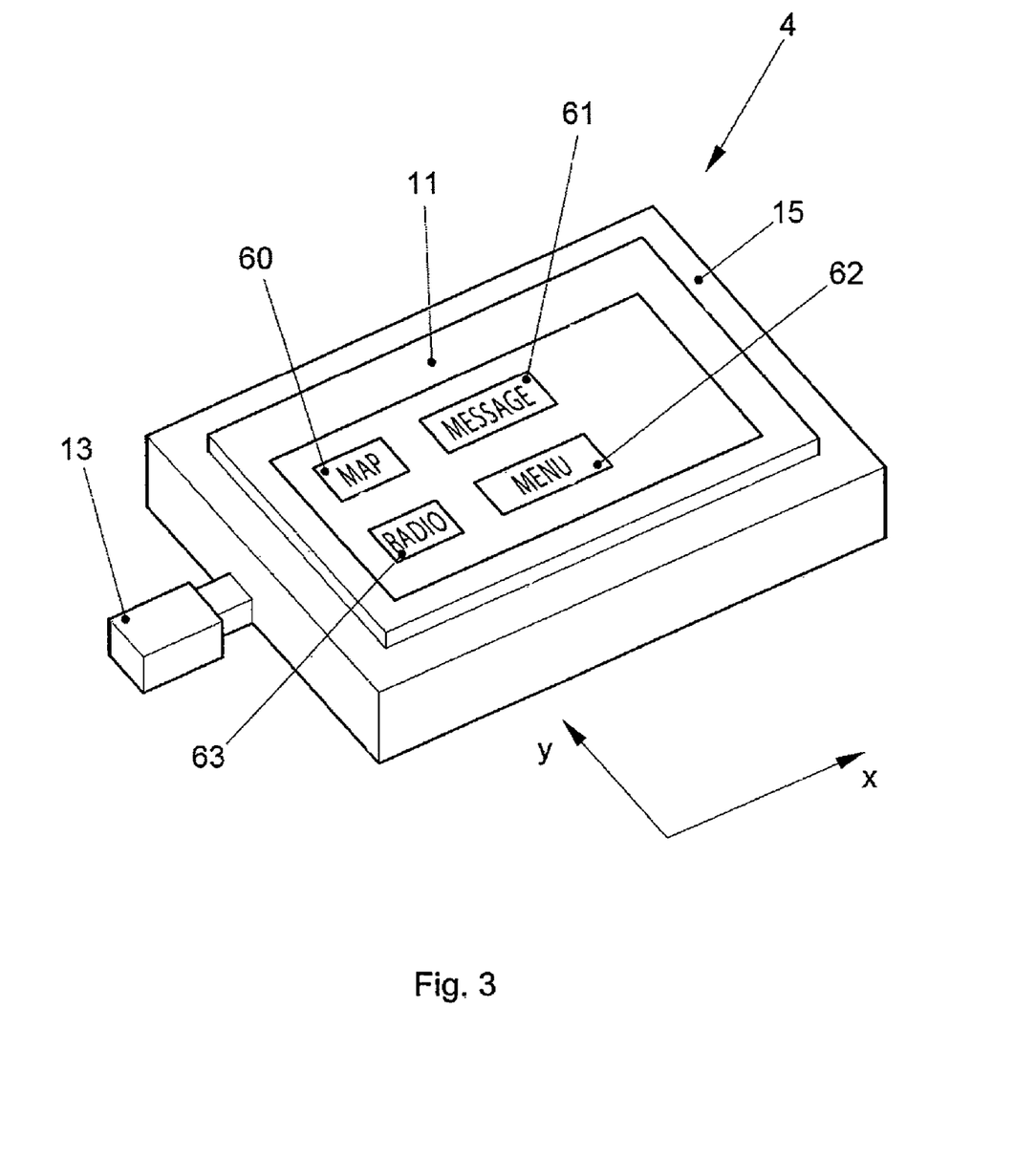
FIG. 3 illustrates a perspective plan view of the input device shown in FIG. 2.
Figure 4:
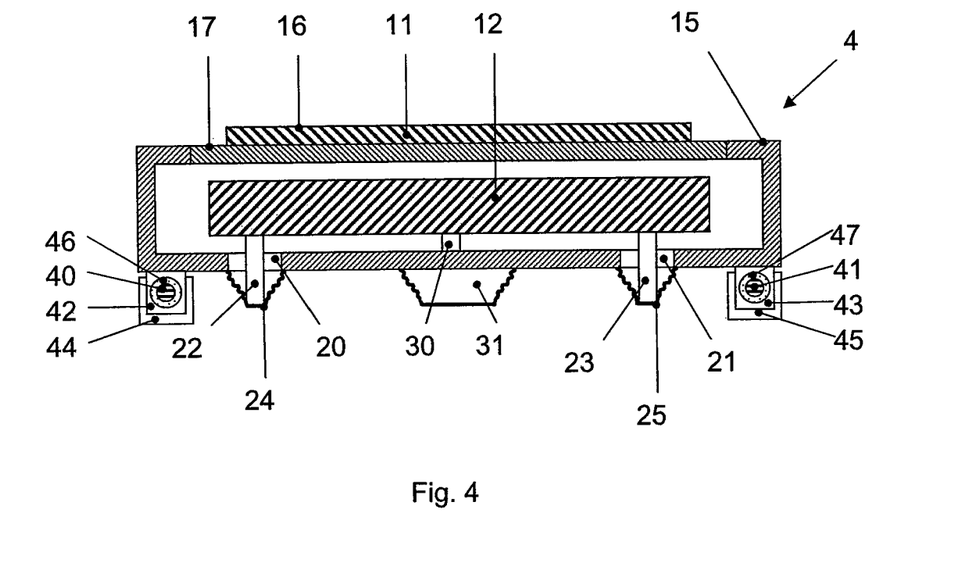
FIG. 4 illustrates the cross-section of the input device shown in FIG. 2.
Figure 5:
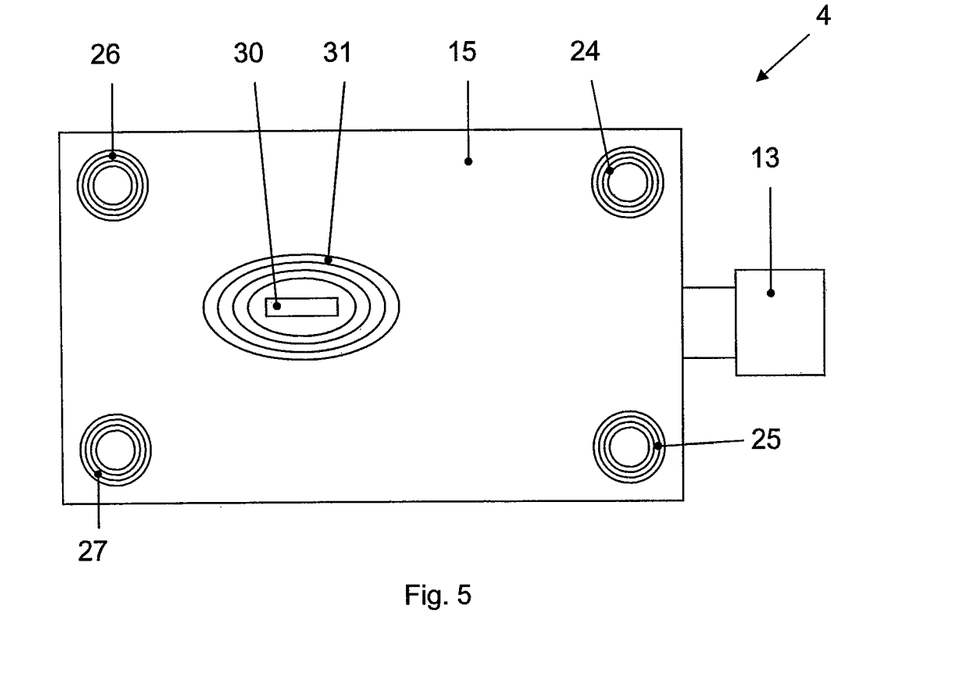
FIG. 5 illustrates the input device shown in FIG. 2 from below.

FIG. 2 is a schematic diagram of the input device 4. FIG. 3 illustrates a perspective plan view of the input device 4. FIG. 4 illustrates the cross-section of the input device 4. FIG. 5 illustrates the input device 4 from below. The input device 4 comprises a housing 15, a display 12 arranged in the housing 15 for visually representing operating information and/or operating elements 60, 61, 62, 63 e.g., for operating the motor vehicle 1, a touch screen 11 arranged above the display 12 and connected to the housing 15 for detecting a touching of the touch screen 11 and for inputting of commands by touching an operating surface 16 of the touch screen 11 and an actuator 13 for moving the housing 15 and thus the touch screen 11 in relation to the display 12 in the x-direction, wherein x and y indicate the coordinates of an orthogonal coordinate system of a plane that is parallel to the operating surface 16 of the touch screen 11. The input device 4 comprises a control unit 10 (not illustrated in FIG. 3, FIG. 4 and FIG. 5), by means of which different information can be represented by generating a corresponding display signal A on the display 12. Furthermore, the control unit 10 reads in a positional signal P generated by the touch screen 11, said positional signal indicating the position of a touching of the operating surface 16 or a pressing on the operating surface 16. In addition, the control unit 10 controls the motion of the actuator 13 by generating an actuator control signal S. The design of the actuator 13 can be inferred from e.g., EP 1 560 102 A1. In addition, e.g., piezo actuators or so-called voice coils can also be used as the actuator 13.

The touch screen 11 is fixed to the housing 15 outside. The housing 15 is transparent at least in the region indicated by reference numeral 17 below the touch screen 11. Alternatively, the touch screen 11 can also be designed as a part of the housing 15.

As illustrated in FIG. 4 and FIG. 5, the housing 15 comprises four openings 20 and 21, each of which is covered by a flexible sleeve 24, 25, 26 and 27 and through which mounting elements 22 and 23 are guided for fixing the display 12 on the steering wheel 2 or the dashboard 3. The housing 15 further comprises another opening, which is covered by another flexible sleeve 31 and through which a plug contact 30 is guided for the energy supply of the display 12 and for transmitting the display signal A to the display 12. The flexible sleeves 24, 25, 26, 27, and 31 can be made, for example, of an elastomer or can comprise an elastomer. Provision is made in particular for adapting the flexibility of the sleeves 24, 25, 26, 27 and 31 to the mass of the housing 15 including the touch screen 11 in such a way that the housing 15 (including the touch screen 11) together with the sleeves 24, 25, 26, 27 and 31 has a mechanical natural frequency of 5 Hz to 150 Hz. In this context, the natural frequency is especially adapted to the actuator 13 or the actuator 13 is selected correspondingly to the natural frequency.

The input device 4 comprises connection elements for the form-fit connection of the housing 15 to the display 12 so that the housing 15 can only move along a straight line in relation to the display 12. For this purpose, a connection element comprises at least one mounting element 44 or 45, which is or can be connected to the steering wheel 2 or to the dashboard 3 for fixing each of the rods 40 and 41. In addition, every connection element comprises at least one sliding element 42 and/or 43 connected to the housing 15 and having at least one slide bearing 46 and/or 47, by means of which the sliding element 42 and/or 43 can move along the rod 40 and/or 41. Provision can also be made for the sliding element 42 and/or 43 to be connected or connectable to the steering wheel 2 or to the dashboard 3 and for connecting the mounting element 44 and/or 45 to the housing 15 (permanently). The moving connection between the display 12 and the housing 15 can be implemented using the steering wheel 2 or the dashboard 3 or using an additional element. In this connection, e.g., both the sliding elements 42 and 43 as well as the mounting elements 44 and/or 45 can be fixed to a frame. This frame can in turn be connected to the steering wheel 2 or to the dashboard 3 for installation in the motor vehicle 1.

In an alternative design, the input device 4 comprises an aforementioned display, an aforementioned touch screen arranged above the display, and also a flexible element arranged between the display and the touch screen for preventing particles from penetrating between the display and the touch screen. In addition, the input device comprises an aforementioned actuator for moving the touch screen in relation to the display in at least a direction that is parallel especially in relation to the operating surface of the touch screen. The flexible element is advantageously arranged at the edge of the touch screen in such a way that it substantially does not hide the display surface of the display. In an advantageous design, the flexible element exhibits a rigidity, which is adapted in such a way to the mass of the touch screen that the touch screen together with the flexible element has a mechanical natural frequency of between 5 Hz and 150 Hz in the movement direction. The natural frequency is especially adapted to the actuator or the actuator is selected correspondingly to the natural frequency. The flexible element can be made of a foamed material, such as e.g., polyurethane or an elastomer. The flexible element can be designed according to U.S. Pat. No. 4,044,186 or the corresponding patent specification DE 2 349 499.

Figure 6:
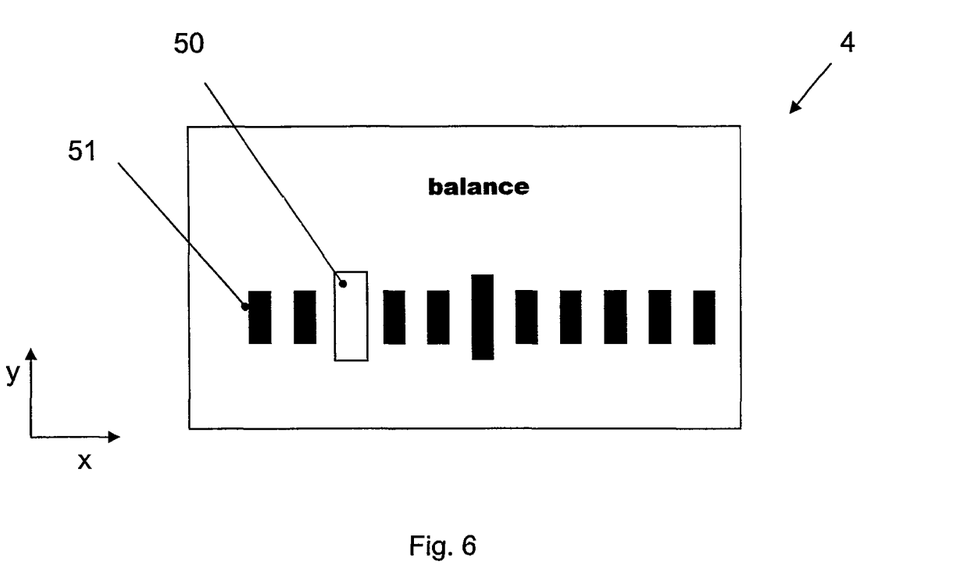
FIG. 6 illustrates the input device shown in FIG. 2 when representing an operating mask for adjusting the balance.

FIG. 6 illustrates the input device 4 when representing an operating mask for adjusting the (acoustic) balance in an infotainment system or a music system. The operating mask is stored as a code in a markup language in a memory 10A (illustrated in FIG. 2) of the control unit 10. A suitable markup language can be e.g., XML, HTML, or 3softGuide. Table 1 shows an example embodiment for the code in the markup language XML.

TABELLE 1

```
<?xml version="1.0" ?>
= <slider id="1">
    <title>Balance</title>
    <color>blue</color>
= <size>
    <height>15</height>
    <width>100</width>
    </size>
= <detents>
    <number>11</number>
    <shape>LittleTick</shape>
    <hapticeffect>sliderdetent1</hapticeffect>
    </detents>
= <centerdetent>
    <shape>BigTick</shape>
    <hapticeffect>sliderdetent2</hapticeffect>
    </centerdetent>
    </slider>
```

Figure 7:
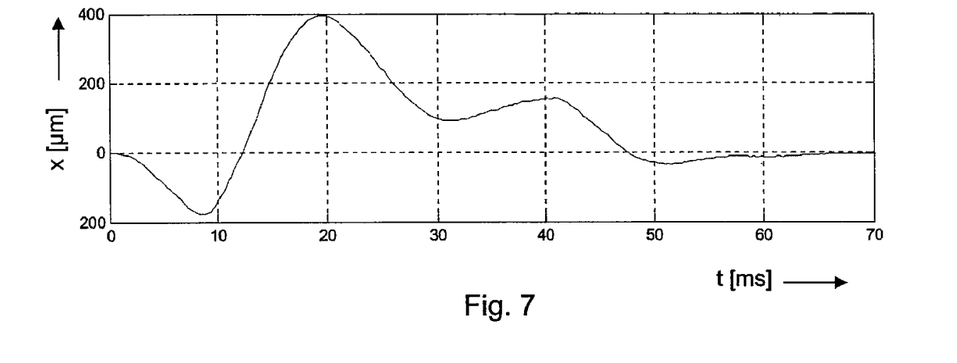
FIG. 7 illustrates a deflection of a touch screen.

The operating mask illustrated in FIG. 6 for adjusting the balance comprises a scale 51 in which a slider 50 illustrated on the display 12 can be moved. The scale 51 comprises eleven tick marks, wherein the middle tick mark is bigger than the other tick marks. The slider can move in increments each of which corresponds to a tick mark. In doing so, provision has been made for haptically "indicating" to the user the attainment of the next tick mark. For this purpose, the touch screen is deflected corresponding to the deflection illustrated in FIG. 7. For this purpose, the command line <hapticeffect>sliderdetent1</hapticeffect> implemented in the syntax of the markup language XML is provided in the code illustrated in table 1.

Figure 8:
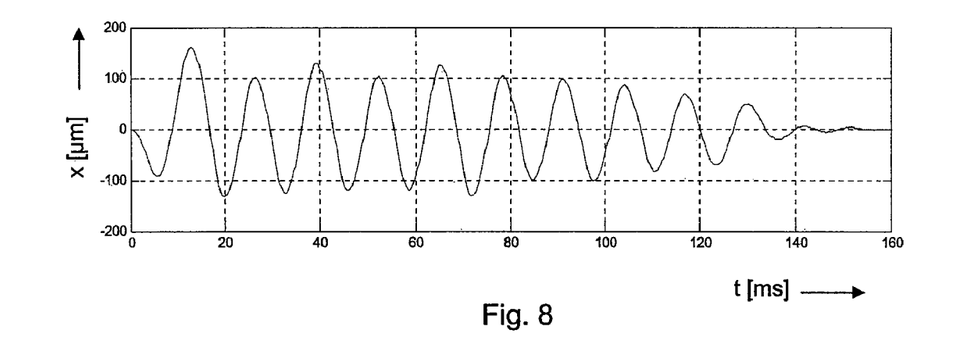
FIG. 8 illustrates a deflection of a touch screen.

In order to haptically "indicate" to the user the attainment of the next middle tick mark, the touch screen is deflected according to the deflection illustrated in FIG. 8. For this purpose, the command line <hapticeffect>sliderdetent2</hapticeffect> implemented in the syntax of the markup language XML is provided in the code illustrated in table 1.

Figure 9:
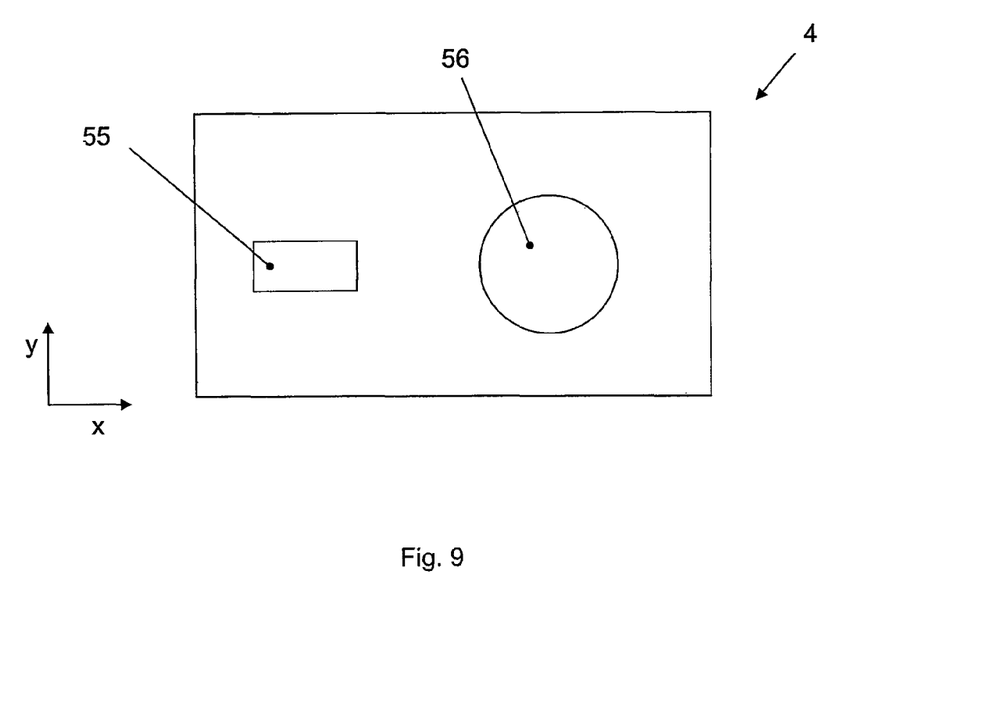
FIG. 9 illustrates the input device shown in FIG. 2 when representing an operating mask for adjusting certain parameters.

FIG. 9 illustrates the input device 4 when representing an operating mask for adjusting certain parameters. In this context, a rectangular pushbutton sensor 55 and a round operating button 56 are illustrated. The operating mask is stored as an image file in the memory 10A of the control unit. An image file can be e.g., a file in the JPEG, GIF, or BITMAP format. Table 2 shows an example embodiment of an image file in the imagemap format.

TABELLE 2

```
<map name="my_image_map">
<area shape="rect" coords="14,30,90,97"
    href="hot_region1.html" hapticeffect="pulse">
<area shape="circle" coords="115,107,32"
    href="hot_region2.html" hapticeffect=37 blip">
<area shape="default" nonref>
</map>
```

In doing so, provision is made for haptically "indicating" to the user a successful operation of the rectangular pushbutton sensor 55. For this purpose, the touch screen is deflected corresponding to the deflection illustrated in FIG. 7. For this purpose, the line
    href="hot_region1.html" hapticeffect="pulse">
is provided in the file shown in table 2.

Figure 10:
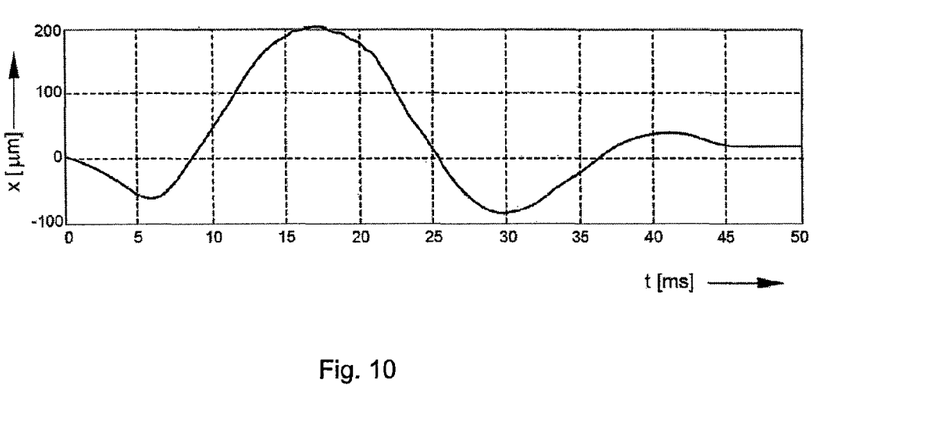
FIG. 10 illustrates a deflection of a touch screen.

In order to haptically "indicate" to the user the successful operation of the round operating button 56, the touch screen is deflected according to the deflection illustrated in FIG. 10. For this purpose, the line
    href="hot_region1.html" hapticeffect="bilp">
is provided in the file illustrated in table 2.

Figure 11:
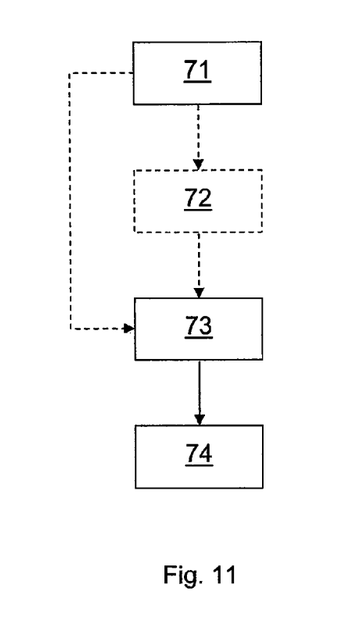
FIG. 11 illustrates a method for producing the input device shown in FIG. 2.

FIG. 11 illustrates a method for producing the input device shown in FIG. 2. The method begins with a step 71, in which control information for a haptic feedback assigned to operating information or to an operating element is created in the syntax of a markup language. An example of such control information in the syntax of a markup language is the command line illustrated in table 1
<hapticeffect>sliderdetent1</hapticeffect>

Figure 12:
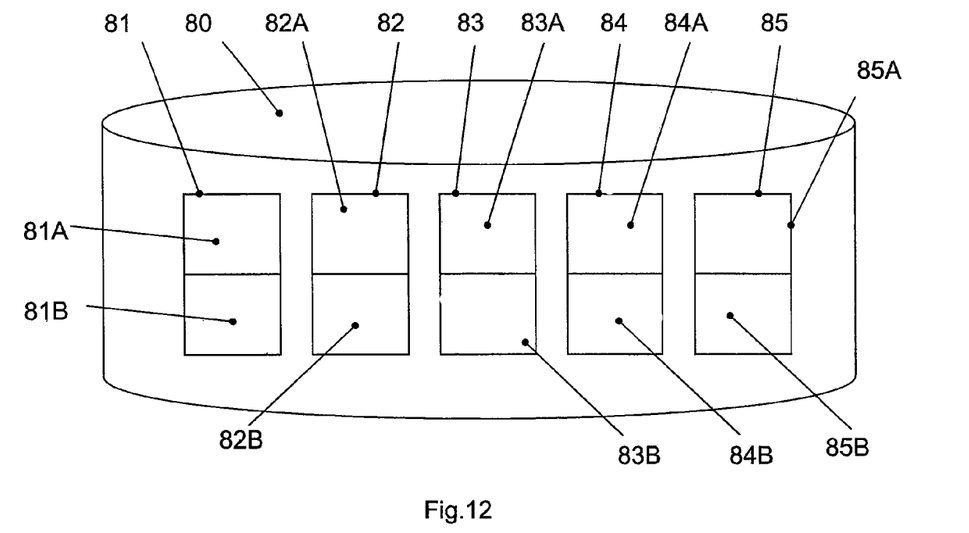
FIG. 12 illustrates a program library or a file library.

In an optional step 72, a program library or a file library 80 with files or data sets 81, 82, 83, 84, 85 is created as illustrated in FIG. 12, wherein a file or a data set 81, 82, 83, 84, 85 comprises
    graphical information 81A, 82A, 83A, 84A, 85A for representing at least operating information or at least one operating element on a display
and
    control information 81B, 82B, 83B, 84B, 85B for a haptic feedback assigned to the operating information or to the operating element.

Step 72 and step 71 are followed by step 73, in which an operating mask is created by selecting a file or a data set 81, 82, 83, 84, 85 or by selecting several files or data sets 81, 82, 83, 84, 85 and/or in which an operating mask is created in the syntax of the markup language inter alia by using the code for haptic feedback. In another step 74, the operating mask is implemented in the control unit 10, e.g., by storing it in the memory 10A.

In an alternative or supplemented embodiment of the method described with reference to FIG. 11, the control information, as described referring to FIG. 9 or table 2, for a haptic feedback assigned to the operating information or to the operating element is integrated into an image file.

Figure 13:
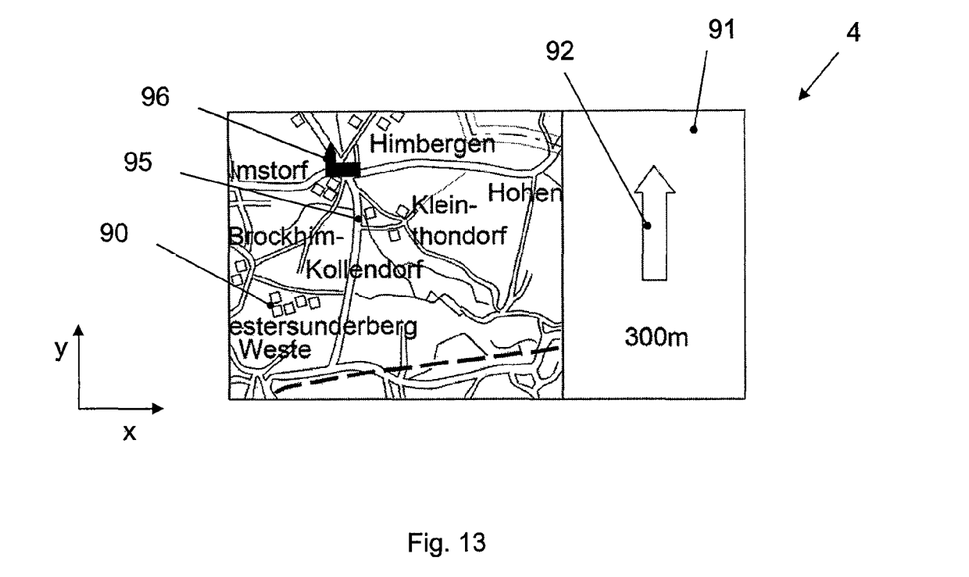
FIG. 13 illustrates the input device shown in FIG. 2 when representing a display of a navigation system.

FIG. 13 illustrates the input device 4 when representing a display for a navigation system, wherein the reference numerals 90 and 91 indicate a map and a field with direction information 92 respectively. In an example embodiment, provision has been made for the user to feel the streets 95 illustrated on the map 90 as (raised) elevations. In doing so, provision has been made for automatically assigning control information for a haptic feedback assigned to the operating information "Street" to the graphical representation of the operating information "Street," according to a method described in FIG. 14.

Figure 14:
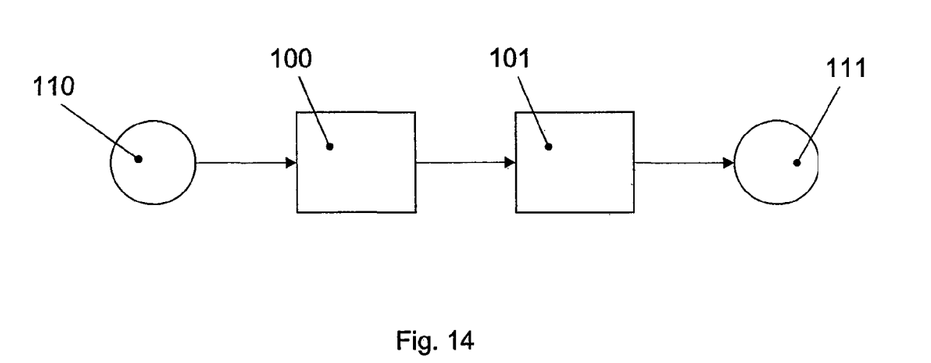
FIG. 14 illustrates a method for assigning control information for a haptic feedback assigned to operating information "Street" to a graphical representation of the operating information "Street"

In this connection, according to the method described in FIG. 14, a pattern recognition 100 of the graphical information "map" 110 takes place, in order to identify the geometric structures of the graphical information "map" 110, especially for identifying the graphical information "Street." The pattern recognition 100 is followed by the actual assignment 101 of the control information for the haptic feedback assigned to the operating information "Street" to the graphical representation of the operating information "Street." The result is a data pool 111, in which a haptic feedback is assigned to the graphical description of the streets. Said haptic feedback conveys the user the feeling of the streets being elevated in a raised form from the surface of the touch screen 11.

Provision can also be made for assigning a haptic feedback in a point of interest (POI) included in a Geographical Information System (GIS), such as e.g., the St Bartholomew's Church indicated by reference numeral 96. Said haptic feedback makes the user feel the church and/or signals to a user the successful selection of the corresponding point of interest.

Figure 15:
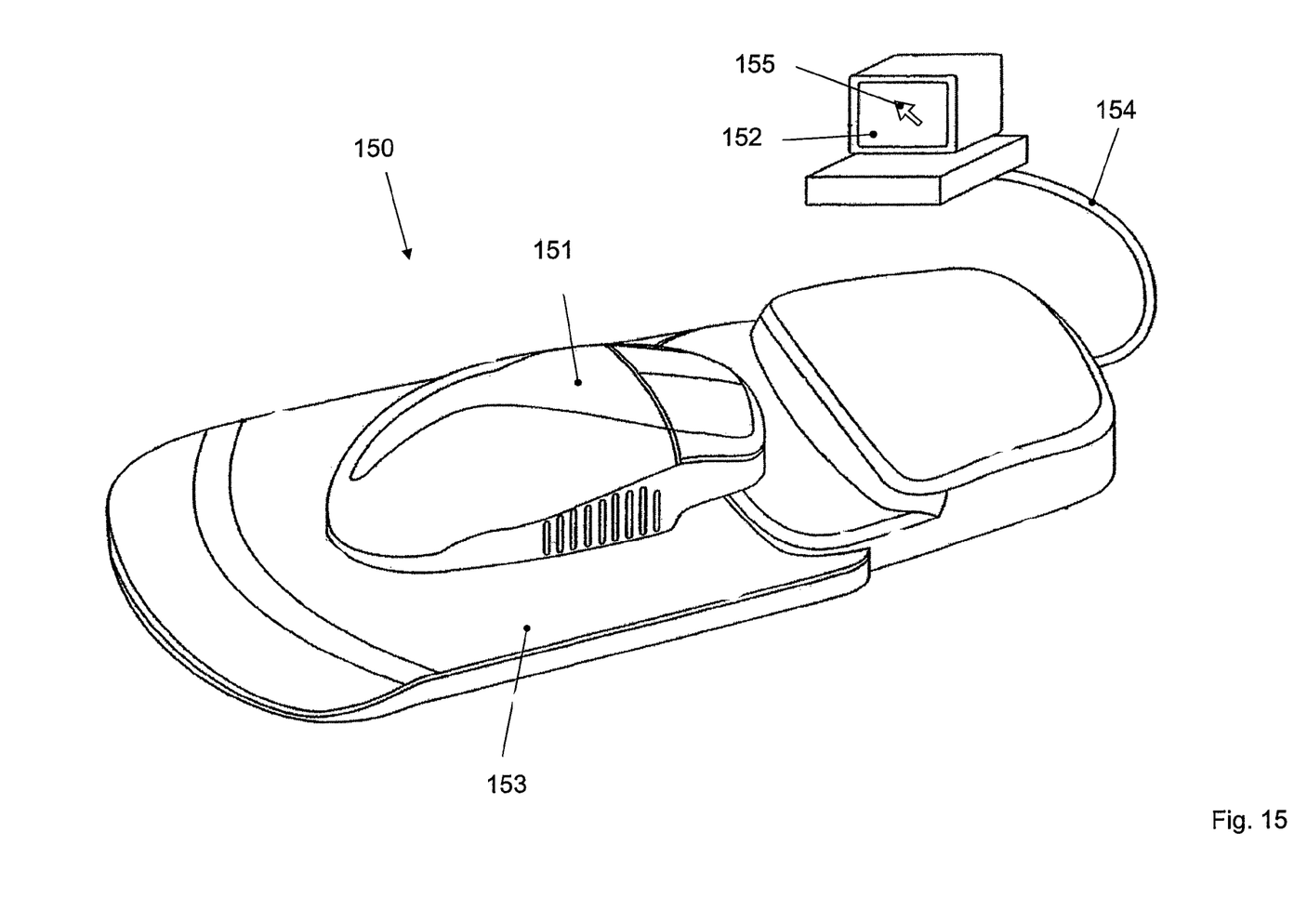
FIG. 15 illustrates the schematic diagram of an example embodiment of an input device.

FIG. 15 is a schematic diagram of an example embodiment of an input device 150. The input device 150 comprises a monitor 152 corresponding to the display 12 and a haptic mouse 151 corresponding to the touch screen 11, wherein said haptic mouse can move on a mouse pad 153 connected to the monitor 152 via a data line 154. An input device comprising a monitor and a haptic mouse is disclosed in WO 99/26230 A1 or the corresponding EP 1 036 390 B1. A haptic feedback corresponding to that described in the example embodiments relating to the touch screen 11 can be created by means of the haptic mouse 151. A visual assignment between the haptic mouse 151 and the monitor 152 can take place e.g., using a mouse pointer 155. The methods described with reference to the input device 4 in the FIGS. 6 to 14 can be transferred similarly to the input device 150.

LIST OF REFERENCE NUMERALS

1 Motor vehicle
2 Steering wheel
3 Dashboard
4, 150 Input device
10 Control unit
10A Memory
11 Touch screen
12 Display
13 Actuator
15 Housing
16 Operating surface
17 Region
20, 21 Opening
22, 23 Mounting element
24, 25, 26, 27, 31 Sleeve
30 Plug contact
40, 41 Rod
42, 43 Sliding element
44, 45 Mounting element
46, 47 Slide bearing
50 Slider
51 Scale
55 Pushbutton sensor
56 Operating knob
60, 61, 62, 63 Operating element
71, 72, 73, 74 Step
80 Program library or file library
81, 82, 83, 84, 85 File or data set 81A, 82A, 83A,
84A, 85A Graphical information
81B, 82B, 83B,
84B, 85B Control information for a haptic feedback assigned to operating information or to an operating element
90 Map
91 Field with direction information
92 Direction information
95 Streets
96 Point of interest or St. Bartholomew's church
100 Pattern recognition
101 Assignment of control information for the haptic feedback assigned to operating information "Street" to a graphical representation of the operating information "Street"
110 Graphical information "map"
111 Data pool
151 Haptic mouse
152 Monitor
153 Mouse pad
154 Data line
155 Mouse pointer
A Display signal
P Positional signal
S Control signal
t Time
x, y Coordinates

The invention claimed is:

1. An input device comprising:
 a display;
 a touch screen arranged above the display and comprising an operating surface;
 an actuator for moving the touch screen in at least one direction;
 a memory storing a file or data set comprising graphical information representing a geographic map including at least one geometrical structure corresponding to at least one operating element; and
 a control unit for:
  accessing the file or data set from the memory;
  visually representing the graphical information from the file or data set by displaying the geographic map including the at least one geometrical structure on the display;
  automatically identifying the geometrical structures in the displayed map using pattern recognition of the graphical information representing the displayed map, wherein the graphical information and geometrical structures do not relate to a detection of a user or other physical object by the input device;
  automatically assigning control information for a haptic feedback to each operating element corresponding to an identified geometrical structure;
  automatically detecting a position of a touching on the operating surface;
  automatically determining that the position of the touching corresponds to an identified geometrical structure corresponding to a particular operating element;
  automatically determining the haptic feedback assigned to the particular identified operating element; and
  generating the determined haptic feedback by controlling the actuator to move the touch screen in at least one direction.

2. An input device according to claim 1, wherein the file is an image file.

3. An input device according to claim 1, wherein the file or the data set comprises commands in a markup language.

4. A method for producing an input device comprising a display and an input element interacting with the display; said method comprising:
 storing in memory a file or data set comprising graphical information for representing a geographic map including at least one geometrical structure corresponding to at least one operating element;
 visually representing the graphical information from the file or data set by displaying the geographic map including the at least one geometrical structure on a display;
 automatically evaluating the graphical information to identify the geometrical structures in the displayed map, wherein the automatic evaluation is performed by means of a pattern recognition of the graphical information representing the displayed map, wherein the graphical information and geometrical structures do not relate to a detection of a user or other physical object by the input device;
 automatically assigning control information for a haptic feedback to each operating element corresponding to an identified geometrical structure;
 automatically detecting a touching of an identified geometrical structure corresponding to a particular operating element displayed on the operating surface;
 automatically determining the haptic feedback assigned to the particular identified operating element; and
 automatically generating the determined haptic feedback to move the input element screen interacting with the display.

5. A method for producing an input device comprising a display and an input device interacting with the display; said method comprising:
 automatically identifying a particular geometrical structure in a displayed map by means of pattern recognition of graphical information representing the displayed map, the graphical information and geometrical structures not relating to a detection of a user or other physical object by the input device;
 automatically determining an operating element corresponding to the identified geometrical structure in the displayed map;
 automatically creating control information for a haptic feedback assigned to the operating element by moving the input element interacting with the display, wherein the control information is created in the syntax of a markup language.

6. A method according to claim 5; said method further comprising:
 the creation of graphical information for representing the operating information or the operating element on a display, wherein the graphical information is created in the syntax of the markup language.

7. A method according to claim 6; said method further comprising:
 the combination of the graphical information and the control information in a data set in the syntax of the markup language.

8. A method for producing an input device comprising a display and an input element interacting with the display; said method comprising:
 implementing an operating mask, which can be represented on the display, by selecting a file or a data set from a plurality of files or data sets, wherein each file or each data set of this plurality of files or data sets comprises graphical information for representing a geographic map including at least one geometrical structure corresponding to at least one operating element on a display and control information for a haptic feedback assigned to each operating element;

visually representing the graphical information from the file or data set by displaying the geographic map including the at least one geometrical structure on the display;

automatically identifying the geometrical structures in the displayed map using pattern recognition of the graphical information representing the displayed map, the graphical information and geometrical structures not relating to a detection of a user or other physical object by the input device;

automatically detecting a touching of an identified geometrical structure in the displayed map, the identified geometrical structure corresponding to a particular operating element;

automatically determining the haptic feedback assigned to the particular identified operating element; and automatically generating the determined haptic feedback to move the input element screen interacting with the display.

* * * * *